United States Patent
Mohri et al.

[19]
[11] Patent Number: 6,098,468
[45] Date of Patent: Aug. 8, 2000

[54] TORQUE MEASURING DEVICE BY INTEGRAL SHAFT BASED UPON INVERSE MAGNETOSTRICTION

[75] Inventors: Kaneo Mohri, 3911-3, Shimadakuroishi, Tenpaku-cho, Tanpaku-ku, Nagoya-shi, Aichi-ken, 468-0027; Nobuyoshi Sugitani, Susono, both of Japan

[73] Assignees: Toyota Jidosha Kabushiki Kaisha, Toyota; Kaneo Mohri, Nagoya, both of Japan

[21] Appl. No.: 09/158,553

[22] Filed: Sep. 22, 1998

[30] Foreign Application Priority Data

Sep. 29, 1997 [JP] Japan .................................. 9-281276

[51] Int. Cl.[7] ........................................................ G01L 3/02
[52] U.S. Cl. ......................................................... 73/862.333
[58] Field of Search ....................... 73/862.333, 862.334, 73/862.335, 862.336, 862.193

[56] References Cited

U.S. PATENT DOCUMENTS

| | | | |
|---|---|---|---|
| 4,882,936 | 11/1989 | Garshelis ............................ | 73/862.333 |
| 5,321,985 | 6/1994 | Kashiwagi et al. ................. | 73/862.335 |
| 5,412,999 | 5/1995 | Vigmostad et al. ................ | 73/862.333 |
| 5,591,925 | 1/1997 | Garshelis ............................ | 73/862.335 |
| 5,831,180 | 11/1998 | Tanaka et al. ...................... | 73/862.333 |
| 5,880,379 | 3/1999 | Tanaka et al. ...................... | 73/862.335 |

FOREIGN PATENT DOCUMENTS 5-196517  8/1993  Japan .
7-181239  7/1995  Japan .

OTHER PUBLICATIONS

O. Dahle, "The Ring Torductor—A Torque–Gauge, Without Slip Rings, For Industrial measurement and Control," *ASEA Journal*, 1960, vol. 33, No. 3, pp. 23–32.

*Primary Examiner*—Max Noori
*Attorney, Agent, or Firm*—Oliff & Berridge, PLC

[57] ABSTRACT

In a torque measuring device having a shaft member bearing circumferentially circulating magnetic fluxes along its outer circumferential surface and adapted to measure a torque applied to the shaft member around its central axis by measuring a distortion of the magnetic fluxes caused by the torque according to an inverse magnetostriction, the shaft member has a principal cylindrical portion axially terminating in an annular end face perpendicular to the central axis, whereby a high density of magnetic fluxes corresponding to the axial length of the principal portion are generated to traverse the annular end face, so as to be detected by a magnetic field sensor to produce an output signal at a high S/N ratio. By forming a less stressed cylindrical portion axially adjacent to the principal cylindrical portion to present a second annular end face opposing the end face of the principal portion, and comparing a density of the magnetic fluxes generated to traverse the second end face with that of the principal cylindrical portion, a hysteresis free torque measurement is available.

9 Claims, 5 Drawing Sheets

TORQUE MEASURING DEVICE BY INTEGRAL SHAFT BASED UPON INVERSE MAGNETOSTRICTION

BACKGROUND OF THE INVENTION

1. Field of the Invention

The present invention relates to a torque measuring device, and more particularly, to a torque measuring device based upon the principle of magnetostriction, or more precisely, an inverse magnetostriction, that is to surmise a stress condition of a ferromagnetic member from a distortion of the magnetic fluxes maintained by the ferromagnetic member according to an inverse application of the principle of magnetostriction.

2. Description of the Prior Art

A measurement of torque is required in various fields and is getting even more essential particularly in the field of controls of automobiles industrial robots, rolling mills of iron plants, production machines, OA machines and instruments, etc.

It is said that the magnetostriction was first found by J. P. Joule in 1842, and in 1960 O. Dahle proposed to measure a torque acting in a rotating shaft by an inverse application of the magnetostriction.

In measuring a torque applied to a ferromagnetic shaft member around its central axis based upon the inverse magnetostriction, since a distortion generated in the magnetic field of the shaft member by a torque applied thereto according to the inverse magnetostriction is generally very weak, it is required that a magnetostriction augmenting layer is formed along the outer circumferential surface of the shaft member by plating, plasma spraying, spattering, combustion coating, laser quick heating/chilling amorphous formation, etc. It was also proposed by Matsushita Electric Industrial Company to wind an amorphous magnetostriction ribbon around a shaft member in a lattice form with inclinations of ±45° relative to its central axis. (Tech. Digest of 8th Sensor Symp. 1989 pp. 279–282)

However, when the shaft member for measuring a torque is for example, a steering shaft of an automobile, the shaft member is subjected to severe operating conditions such as changes of temperature over a wide range, and incessant vibrations and shocks, while, on the other hand, the requirement for the accuracy and reliability of the measurement is relatively high, with a simultaneous strong requirement for low costs of manufacture. The situation will be the same with respect to other members of automobiles of which it is desired to measure a torque applied therethrough, thereby rendering none of those surface treatments for the magnetostriction augmentation being employable for torque measurements of mechanical members of automobiles.

Although it is being researched to measure the torque by a normal steel shaft member with no such magnetostriction augmenting surface treatment, no success is yet heard because of a poor S/N ratio, i.e. ratio of effective signal to noise, available from an outer circumferential surface portion of a normal steel shaft member.

On the other hand, it has been proposed by Japanese Patent Laid-open Publication 5-196517 based upon U.S. Ser. No. 07/736,299 to mount a sleeve element around a shaft member by shrinkage, the sleeve element being made of a ferromagnetic material and magnetized to bear magnetic fluxes strong enough to generate a distortion thereof at an acceptable S/N ratio according to a torque applied to the shaft member. However, such can shrinkage assembled construction needs a special art of manufacture bound with a relatively high cost of manufacture, and yet not applicable to all kinds of shaft members, and further it is liable to a wide range of fluctuations in the performance according to respective products due to a small fluctuation in the diametrical size of the members to shrink and to be shrunk, in addition to changes of temperature which cause different thermal expansions of the shrinking and shrunk members.

SUMMARY OF THE INVENTION

In view of the above-mentioned problems in the prior art of the torque measuring device based upon the inverse magnetostriction, it is a primary object of the present invention to provide a torque measuring device operative by an integral shaft member applied with no magnetostriction augmenting surface treatment, so as to generate an output signal at a high S/N ratio acceptable for various industrial purposes.

According to the present invention, the above-mentioned primary object is accomplished by a torque measuring device comprising a shaft member having a central axis and a generally circular cross section centered at the central axis to be applied with a torque to be measured around the central axis, and first magnetic field measuring means, the shaft member having an integral annular outer circumferential portion made of a ferromagnetic material, wherein the shaft member includes such a first annular axial portion of the integral ferromagnetic annular outer circumferential portion that axially terminates with a first end face substantially perpendicular to the central axis of the shaft member and is magnetized to bear magnetic fluxes circumferentially circulating therealong, the first magnetic field measuring means measuring magnetic fluxes generated to traverse the first end face of the first annular axial portion by the shaft member being applied with a torque to be measured therethrough, so as to measure the torque applied to the shaft member based upon an inverse magnetostriction.

The magnetostriction of ferromagnetic materials is inevitably bound with a substantial hysteresis, especially in ferromagnetic materials having large coercivity from which the power steering shafts of automobiles are made. Although the relationship between a torque applied to a shaft member and a corresponding distortion of the magnetic field born by the shaft member is traceable even under such a substantial hysteresis by modern electronic circuits, it will be of course much more convenient if an output signal is available from the torque measuring device with no hysteresis, so that the output signal of the torque measuring device is directly usable for any control circuit or the like without complicated computational processes.

Therefore, it is a further object of the present invention to provide a torque measuring device which can generate a torque measurement signal with no substantial hysteresis of the magnetostriction of ferromagnetic materials, so that the output signal is directly usable with no signal processing for cancellation of the hysteresis.

According to the present invention, the above-mentioned further object is accomplished by a torque measuring device comprising a shaft member having a central axis and a generally circular cross section centered at the central axis to be applied with a torque to be measured around the central axis, first magnetic field measuring means, second magnetic field measuring means, the shaft member having an integral annular outer circumferential portion made of a ferromagnetic material, wherein the shaft member includes such a first annular axial portion of the integral ferromagnetic annular outer circumferential portion that axially terminates with a first end face substantially perpendicular to the central axis of the shaft member and is magnetized to bear magnetic fluxes circumferentially circulating therealong, the first magnetic field measuring means measuring magnetic fluxes generated to traverse the first end face of the first annular axial portion by the shaft member being applied with a torque to be measured therethrough, while the shaft member also including such a second annular axial portion of the integral ferromagnetic annular outer circumferential portion that axially terminates with a second end face substantially perpendicular to the central axis of the shaft member and is magnetized to bear magnetic fluxes circumferentially circulating therealong, the second annular axial portion being proportionally less stressed by the torque applied to the shaft member than said first annular axial portion, the second magnetic field measuring means measuring magnetic fluxes generated to traverse the second end face of the second annular axial portion by the shaft member being applied with the torque to be measured therethrough, so as to measure the torque applied to the shaft member based upon an inverse magnetostriction, with a cancellation of an influence of a hysteresis in the inverse magnetostriction of the ferromagnetic material to the result of measurement by a compensation of the measurement by the first magnetic field measuring means with the measurement by the second magnetic field measuring means.

Or, alternatively, the above-mentioned further object of the present invention is accomplished by a torque measuring device according to the present invention may be constructed to comprise a shaft member having a central axis and a generally circular cross section centered at the central axis to be applied with a torque to be measured around the central axis, and magnetic filed measuring means, the shaft member having an integral annular outer circumferential portion made of a ferromagnetic material, wherein the shaft member includes such a first annular axial portion of the integral ferromagnetic annular outer circumferential portion that axially terminates with a first end face substantially perpendicular to the central axis of the shaft member and is magnetized to bear magnetic fluxes circumferentially circulating therealong, and such a second annular axial portion of the integral ferromagnetic annular outer circumferential portion that axially terminates with a second end face substantially perpendicular to the central axis of the shaft member and is magnetized to bear magnetic fluxes circumferentially circulating therealong, the second annular axial portion being proportionally less stressed by the torque applied to the shaft member than said first annular axial portion, the second end face axially opposing the first end face with an annular groove formed therebetween, the magnetic filed measuring means measuring the magnetic fluxes generated to traverse the first end face of the first annular axial portion under an interference of magnetic fluxes generated to traverse the second end face of the second annular axial portion by the shaft member being applied with the torque to be measured therethrough, so as to measure the torque applied to the shaft member based upon an inverse magnetostriction, with a cancellation of an influence of a hysteresis in the magnetostriction of the ferromagnetic material to the result of measurement according to a hysteresis canceling interference of the magnetic fluxes traversing the second end face with the magnetic fluxes traversing the first end face.

In the above-mentioned torque measuring device, the second annular axial portion may be defined between two annular grooves formed as axially spaced along the shaft member. Or, the second annular axial portion may be defined between an annular groove axially spacing the second annular axial portion from the first annular axial portion and a reduced diameter axial portion extending on an axial side of the second annular axial portion opposite to the annular groove with an outer diameter smaller than that of the second annular axial portion. Or, the second annular axial portion may be an annular outer circumferential portion of an axial portion of the shaft member having a larger diameter than the first annular axial portion and axially spaced from the first annular axial portion via an annular groove formed therebetween.

BRIEF DESCRIPTION OF THE DRAWINGS

In the accompanying drawings.

DESCRIPTION OF THE EMBODIMENTS

Figure 1:
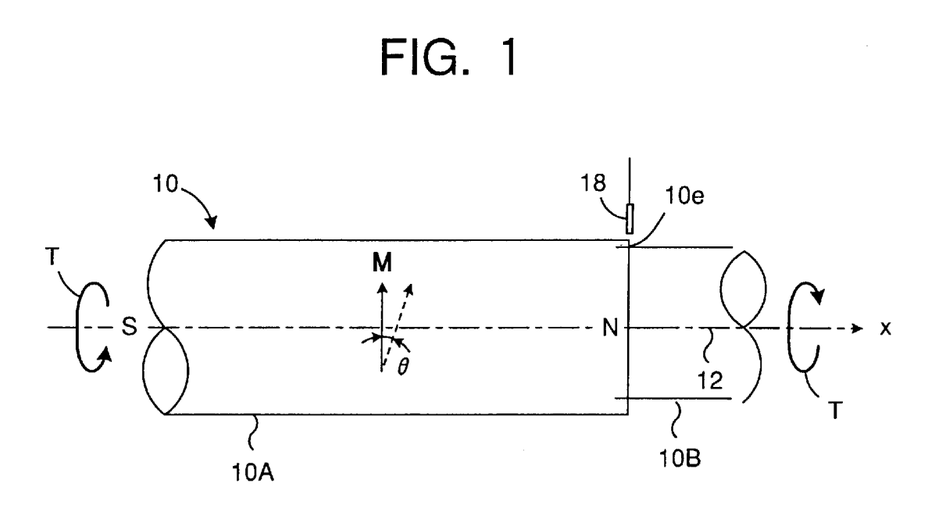
FIG. 1 is a somewhat diagrammatical illustration of an essential part of the basic construction of the torque measuring device according to the present invention.

Referring to FIG. 1 showing the basic construction of the torque measuring device according to the present invention, a generally cylindrical shaft member 10 has a first cylindrical portion 10A and a second cylindrical portion 10B aligned along a central axis 12, the both cylindrical portions being respectively integral by itself and with one another. The shaft member 10 is totally made of an ordinary ferromagnetic material such as S45C for constructing a steering shaft of an automobile. The cylindrical portion 10A occupies a principal portion of the shaft member, while the cylindrical portion 10B forms an end portion of the shaft member as reduced in the diameter from the cylindrical portion 10A at an annular step presenting an annular end face 10e extending substantially perpendicular to the central axis 12 of the shaft member.

The shaft member 10, particularly the main shaft portion 10A, is magnetized to bear magnetic fluxes circulating in parallel with one another in a outer circumferential surface portion of the shaft member, the density of which per unit length of the shaft member is expressed by a vector amount M aligned in each circumferential direction as shown by an arrow in FIG. 1, so that no magnetic pole appeals at the annular end face 10e, as long as no torque is applied to the shaft member 10. Such a magnetization of the shaft member 10 is available by conducting an electric current of the order of 10,000 ampere of an alternating current such as at 60 Hz but only for a half cycle of its sign wave shape through the shaft member 10 along the axis thereof.

Figure 2:
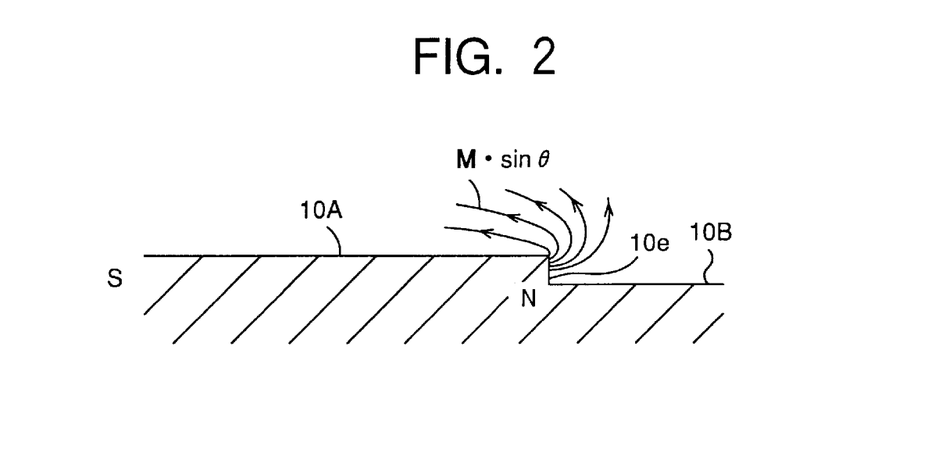
FIG. 2 is a cross sectional view of a part of the shaft member shown in FIG. 1.

When the shaft member 10 is made of an ordinary steel such as S45C, flux density M of the circumferentially circulating magnetic field thus generated per unit length of the shaft member is not so strong as will be available by a shaft member of the same diametrical size applied with the above-mentioned magnetostriction augmentation treatment or the above-mentioned sleeve element particularly prepared by a highly ferromagnetic material. However, when the cylindrical shaft portion 10A is an integral part of a shaft member such as a steering shaft of an automobile, it can have a relatively large axial length, and therefore, when a torque T is applied to the shaft member 10, so that the fluxes are inclined with an angle $\theta$ due to an inverse magnetostriction over the axial length, a magnet pole having a flux density corresponding to $M \cdot \cos \theta$ is generated at the edge of the annular end face 10e, which can be much larger than that available by the above-mentioned sleeve element restricted of its length due to structural limitations of the shaft device, as diagrammatically shown in FIG. 2. Therefore, when the density of the magnetic fluxes generated to traverse the annular end face 10e is measured by an appropriate magnetic field measuring means 18 such as, for example, a magneto-impedance element proposed by one of the inventors of the present application in Japanese Patent Laid-open Publication 7-181239, the torque T applied to the shaft member 10 is measured at a substantially high S/N ratio, with no special magnetostriction augmentation treatment or no special magnetostriction sleeve being applied to the outer circumferential portion of the shaft member.

Figure 3:
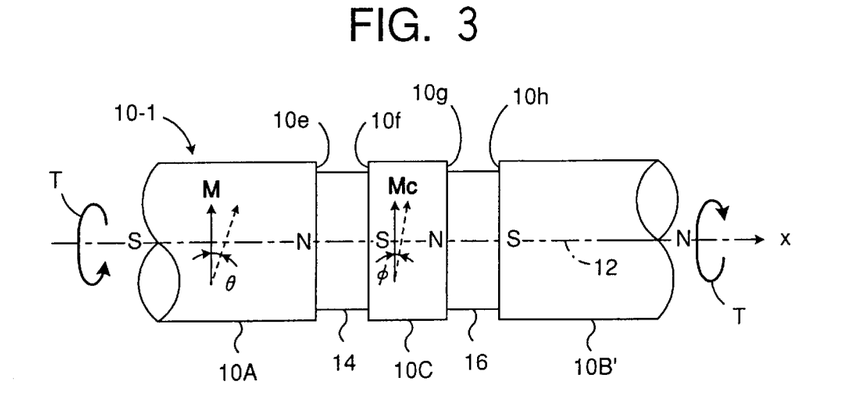
FIG. 3 is a somewhat diagrammatical illustration of an essential part of a shaft member for constructing a further embodiment of the torque measuring device according to the present invention.

FIG. 3 is a view similar to FIG. 1, showing a shaft member for constructing another embodiment of the torque measuring device according to the present invention. In FIG. 3, the portions corresponding to those shown in FIG. 1 are designated by the same reference numerals as in FIG. 1. In this embodiment, the shaft member 10-1 has a principal cylindrical portion 10A similar to that of the shaft member 10 of FIG. 1, and further instead of the simple reduced diameter end portion 10B in the shaft member 10 of FIG. 1, the shaft member has an end portion including cylindrical portions 10B' and 10C of the same diameter as the principal portion 10A, and reduced diameter portions 14 and 16 isolating an outer circumferential portion of the cylindrical portion 10C from those corresponding outer circumferential portions of the principal portion 10A and the end cylindrical portion 10B', respectively. In other words, the end portion of the shaft member 10-1 shown in FIG. 3 is formed such that a cylindrical shaft member providing the principal shaft portion 10A is formed with two annular grooves corresponding to the reduced cylindrical portions 14 and 16, while leaving a short full diameter portion provided by the cylindrical portion 10C therebetween. As will be seen in FIG. 3, an annular end face 10f substantially perpendicular to the central axis 12 is formed to define the cylindrical portion 10C against the principal cylindrical portion 10A, while annular end faces 10g and 10h substantially perpendicular to the central axis 12 are formed at the opposing edges of the cylindrical portions 10C and 10B', with interposition of the reduced cylindrical portion 16.

The principal cylindrical portion 10A is magnetized in the same manner as the principal cylindrical portion 10A of the shaft member, 10 of FIG. 1, so as to have circumferentially circulating magnetic fluxes at a flux density M per unit length. Similarly, the cylindrical portion 10C is also magnetized to have a circumferentially circulating magnetic fluxes at a flux density Mc per unit length. The magnetization of both portions may be effected by the same manner as described with respect to the shaft member shown 10 in FIG. 1. When the cylindrical portion 10A and 10C are so magnetized by the method of conducting a half wave pulse of an alternating electric current such as 60 Hz 10,000 ampere along the central axis 12, the cylindrical portion 10B' as well as the reduced cylindrical portions 14 and 16 are also magnetized to maintain respective circumferentially circulating magnetic fluxes.

Figure 4:
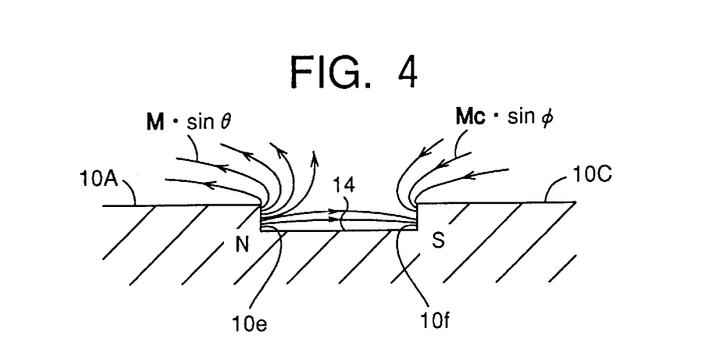
FIG. 4 is a cross sectional view of a part of the shaft member shown in FIG. 3.

When a torque T is applied to the shaft member of FIG. 3 around the central axis, the circumferentially circulating magnetic fluxes are helically deviated as shown by dotted lines, respectively, in the same manner as in the shaft member of FIG. 1. Therefore, flux density $M \cdot \sin \theta$ is generated to traverse the annular end face 10e in the same manner as in the shaft member of FIG. 1, while at the same time flux density $M \cdot \sin \theta$ is also generated to traverse the annular end face 10f in the direction opposite to that of the magnetic fluxes traversing the end face 10e, as shown in FIG. 4. In this case, the angle of inclination $\phi$ the fluxes in the shaft portion 10C is smaller than the angle of inclination $\theta$ of the fluxes in the shaft portions 10A due to a less transmission of the torque stress from the shaft portions 10A and 10B' to the shaft portion 10C across the grooves 14 and 16.

Figure 5:
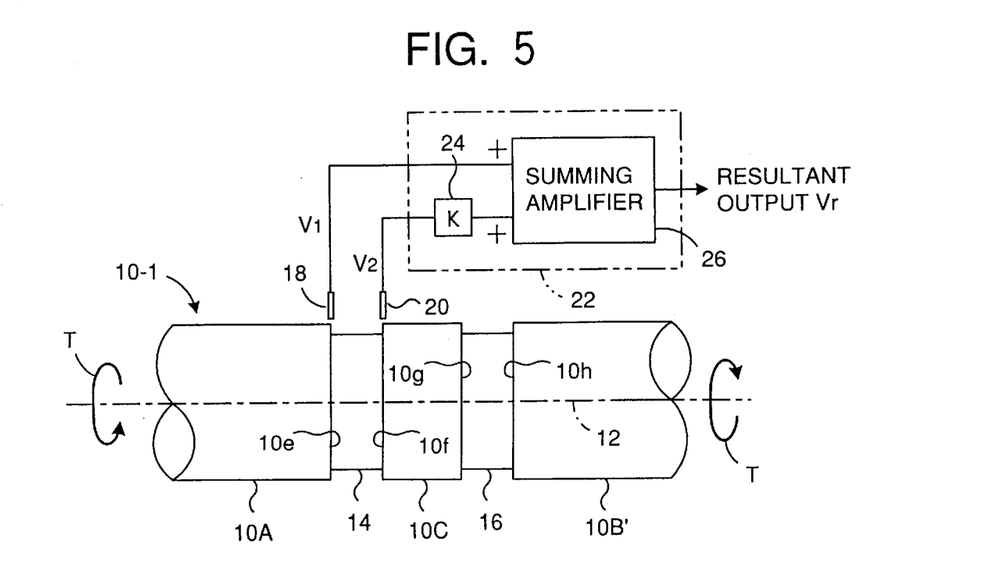
FIG. 5 is a somewhat diagrammatical illustration of a further embodiment of the torque measuring device according to the present invention.
Figure 6:
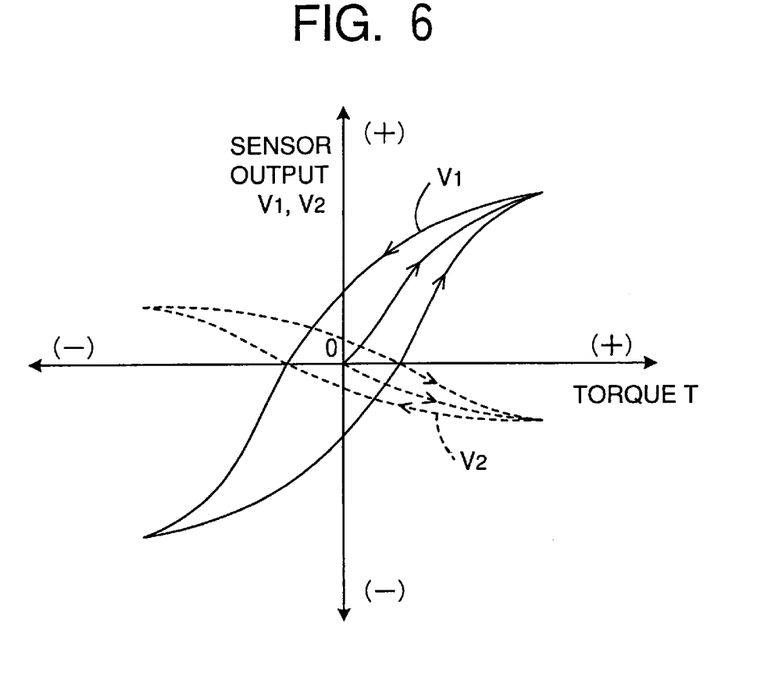
FIG. 6 is a diagram showing the hysteresis of the ferromagnetic material forming the shaft member of FIG. 5, exhibited at two different sensing points thereof.
Figure 7:
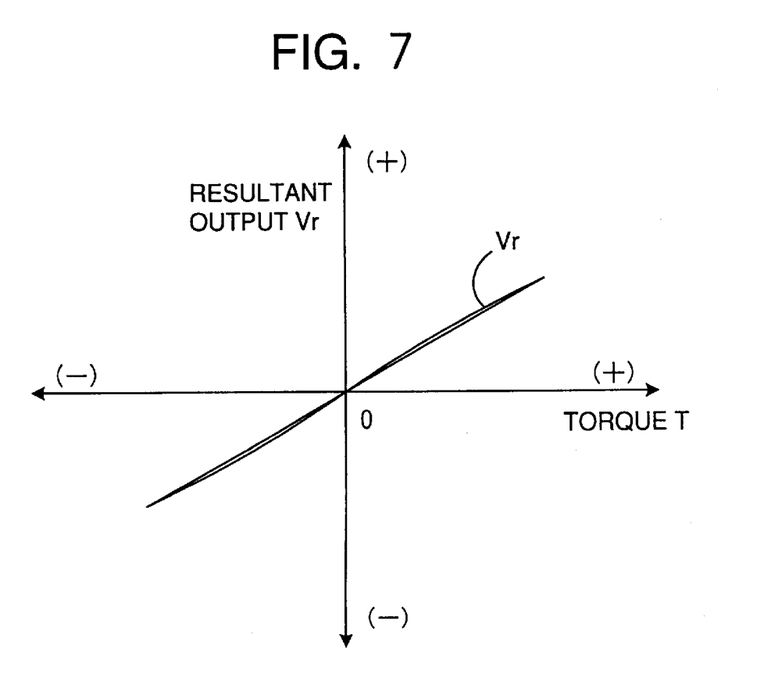
FIG. 7 is a diagram showing the performance of the output signal available by the torque measuring device shown in FIG. 5.

FIG. 5 shows an embodiment of the torque measuring device constructed with the shaft member 10-1 of FIG. 3. As shown in FIG. 5, a first magnetic field measuring means 18 similar to that shown in FIG. 1 is disposed to measure the flux density $M \cdot \sin \theta$ generated to traverse the annular end face 10e by the application of the torque T to the shaft member 10-1. Similarly, a second magnetic field measuring means 20 is disposed to measure the flux density $M \cdot \sin \theta$ generated to traverse the annular end face 10f. The flux intensity traversing the annular end face 10e or output VI of the first magnetic field measuring means 18 changes according to the application of torque to the shaft member 10-1 as shown by a solid line in FIG. 6, exhibiting a typical performance of the hysteresis in the inverse magnetostriction of a ferromagnetic material. On the other hand, the flux density traversing the annular end face 10f or output V2 of the second magnetic field measuring means 20 changes according to the application of torque as shown in FIG. 6 by a broken line, also exhibiting a typical performance of the hysteresis of the inverse magnetostriction of a ferromagnetic material. When the shaft member 10-1 is applied with the torque T around the central axis 12, although the cylindrical portions 10A, 14, 10C, 16 and 10B' bear the same torque in each entire cross section to endure the torque according to the same performance regarding the relationship between the magnitude of torque and the intensity of distortion of the magnetic field, since the annular outer circumferential portion of the cylindrical portion 10C is isolated from both of the annular outer circumferential portions of the cylindrical portions 10A and 10B' by the reduced diameter portions 14 and 16, respectively, the absolute value of the distortion of the magnetic field caused by the same torque in the cylindrical portion 10C is lower than that caused in the magnetic field of the cylindrical portion 10A, as will be appreciated by the contrast of the performance curves of V1 and V2. Therefore, when the signal V1 is added with an appropriately magnified signal V2 by such a signal processing circuit 22 as shown in FIG. 5, wherein 24 is a magnifying circuit having a magnification factor K and 26 is a summing amplifier, the resultant output Vr becomes such as shown in FIG. 7, almost completely canceling the deviation due to the hysteresis in the inverse magnetostriction of the ferromagnetic material. Indeed, in the example shown in FIG. 6, the magnification factor K may be approximately 3. Therefore, by such an arrangement as shown in FIG. 5, the magnitude of torque is detectable with no particular computing process for tracing and canceling the hysteresis according to the curve of V1 of FIG. 6.

Figure 8:
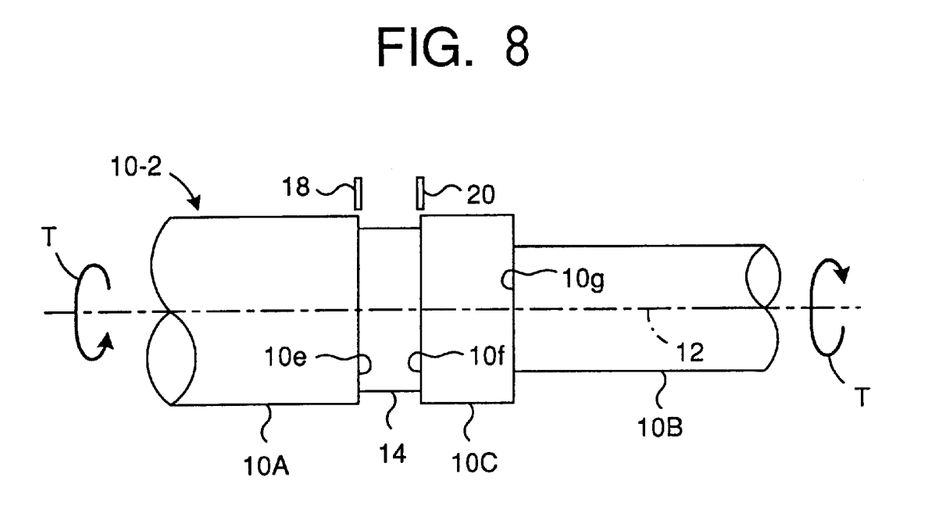
FIGS. 8 and 9 are somewhat diagrammatical illustrations of other embodiments of the shaft member for constructing the torque measuring device according to the present invention.

FIG. 8 is a view similar to FIG. 5, except that a signal processing means such as 22 in FIG. 5 is omitted for the purpose of clearity, showing another embodiment of the shaft member usable for the torque measuring device according to the present invention in the same manner as the shaft member 10-1 shown in FIGS. 3 and 5. In FIG. 8, the portions corresponding to those shown in FIGS. 3 and 5 are designated by the same reference numerals. In this embodiment, the shaft member 10-2 has a simply reduced cylindrical portion 10B similar to that of the shaft member 10 of FIG. 1, except a cylindrical portion 10C having the same outer diameter as the principal cylindrical portion 10A. It will be apparent that the shaft member 10-2 operates in the same manner as the shaft member 10-1 shown in FIGS. 3 and 5.

Figure 9:
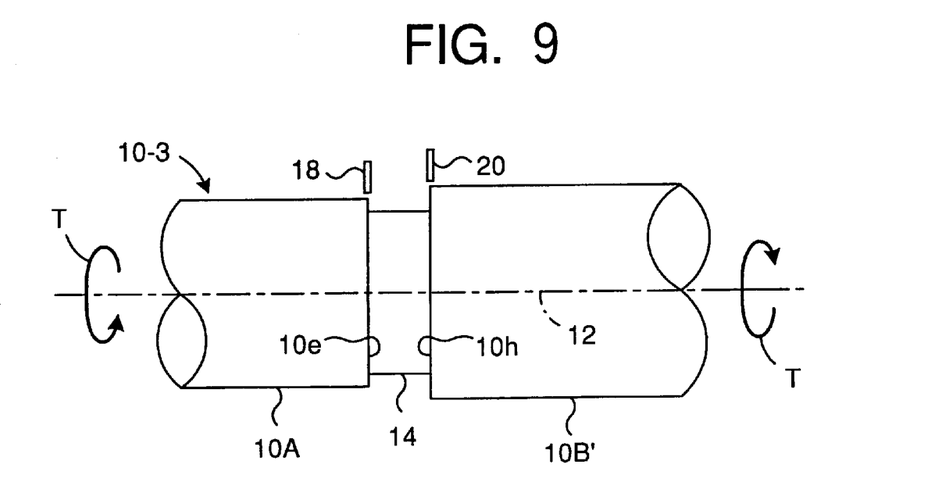

FIG. 9 shows still another embodiment of the torque measuring device. In FIG. 9, the portions corresponding to those shown in the preceding embodiments are designated by the same reference numerals. In this embodiment, the shaft member 10-3 has an end portion 10B' serving for both of the cylindrical portions 10C and 10B' of the embodiment of FIG. 5. Since the end cylindrical portion 10B' has a larger outer diameter than the principal cylindrical portion 10A, the stress acting in the outer circumferential portion of the cylindrical portion 10B' due to a torque T applied to the shaft member around its central axis 12 is lower than the corresponding stress acting along the outer circumferential portion of the cylindrical portion 10A. Therefore, even by such a construction of the shaft member, two outputs correlated with one another like the outputs V1 and V2 of FIG. 6 are available by the magnetic field measuring means 18 and 20 corresponding to those in the embodiment of FIG. 5.

Figure 10:
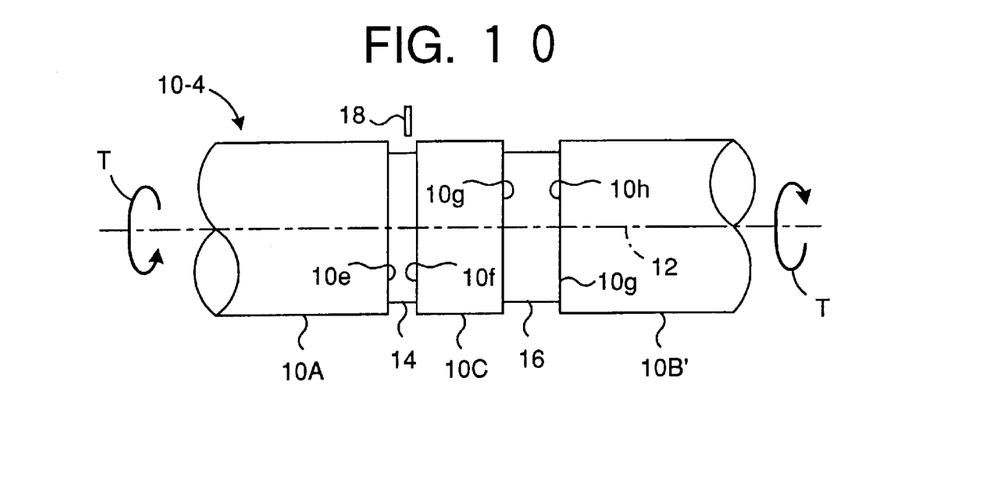
FIG. 10 is a somewhat diagrammatical illustration showing a still further embodiment of the torque measuring device according to the present invention.

FIG. 10 shows a still further embodiment of the torque measuring device according to the present invention. In FIG. 10, the portions corresponding to those shown in the preceding embodiments are designated by the same reference numerals. In this embodiment, the shaft member 10-4 basically corresponding to the shaft member 10-1 shown in FIGS. 3 and 5 is formed to have a shorter axial length for the reduced diameter portion 14 than that of the shaft member 10-1, and a single magnetic field measuring means such as 18 is disposed as spaced from the annular end face 10e and the annular end face 10f with respective distances which are approximately 3 vs. 1 in ratio. By the magnetic field measuring means 18 being so disposed as shown in FIG. 10, since the magnetic fluxes traversing the annular end face 10e and the magnetic fluxes traversing the annular end face 10f are disposed so close to one another as to directly interfere with one another, the intensity of the magnetic fluxes measured by the magnetic field measuring device 18 of FIG. 10 is a result of an addition of the intensity of the magnetic field traversing the end face 10e and a three times magnified intensity of the magnetic field traversing the end face 10f in the ratio therebetween, thereby canceling the hysteresis component included in the intensity of the magnetic field traversing the end face 10e. Therefore, by such an arrangement, an output corresponding to the resultant output Vr shown in FIG. 7 is obtained from the single magnetic field measuring means 18.

Figure 11:
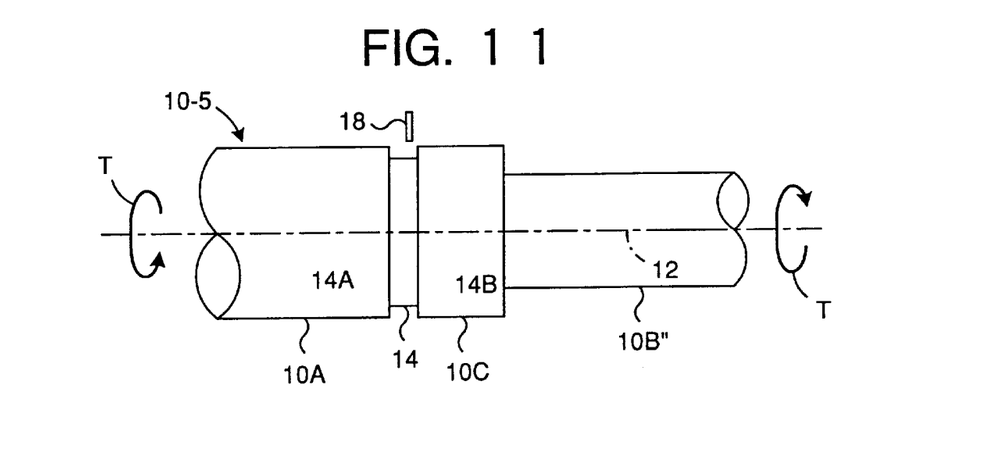
FIGS. 11 and 12 are views similar to FIG. 10, showing two separate modifications of the embodiment shown in FIG. 10.

FIG. 11 shows a modification of the embodiment shown in FIG. 10 based upon the same hysteresis component cancellation principle as in the embodiment of FIG. 10. In FIG. 11, the portions corresponding to those shown in the preceding embodiments are designated by the same reference numerals. The shaft member 10-5 of FIG. 11 is different from the shaft member 10-4 of FIG. 10 only in the end portion, wherein the reduced diameter portion 16 and the cylindrical portion 10B' of the same outer diameter as the cylindrical portion 10A of the shaft member 10-4 are replaced by a single reduced diameter portion 10B. It will be appreciated that the same operation performance is available by the embodiment of FIG. 11 as in the embodiment of FIG. 10.

Figure 12:
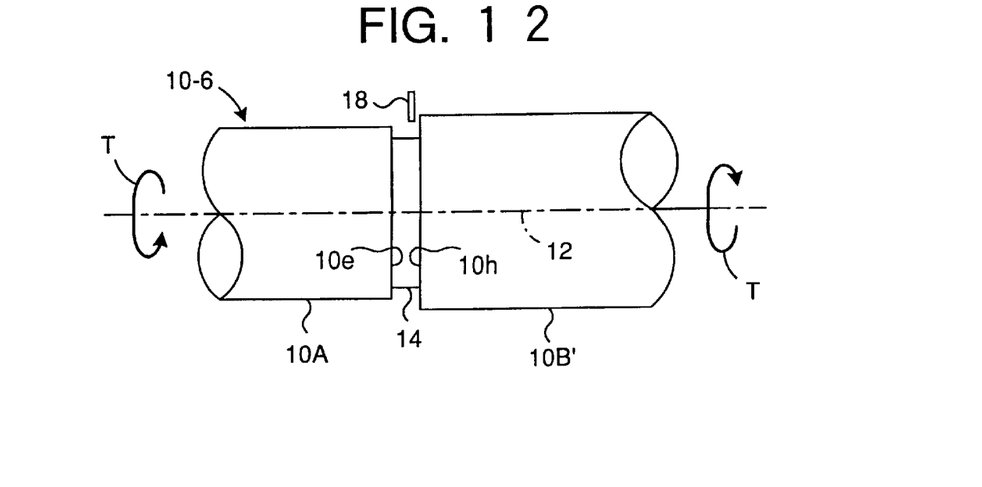

FIG. 12 shows still another modification of the embodiment shown in FIG. 10, based upon the same hysteresis component cancellation principle. In FIG. 12, the portions corresponding to those shown in the preceding embodiments are designated by the same reference numerals. The embodiment of FIG. 12 is a combination of the concept of the shaft member shown in FIG. 9 and the concept of disposing a single magnetic fields measuring means shown in FIG. 10. In other words, the shaft member 10-6 of FIG. 12 is basically of the same configuration as the shaft member 10-3 of FIG. 9, except that the axial length of the reduced diameter portion 14 is shortened for the purpose described with reference to the embodiment of FIG. 10. It will be apparent that the embodiment of FIG. 12 operates substantially in the same manner as the embodiment of FIG. 10, providing substantially the same operational performance as that of the embodiment of FIG. 10.

Although the present invention has been described in detail with respect to some preferred embodiments thereof, it will be apparent for those skilled in the art that various modifications are possible with respect to the shown embodiments within the scope of the present invention.

What is claimed is:

1. A torque measuring device comprising a shaft member having a central axis and a generally circular cross section centered at the central axis to be applied with a torque to be measured around the central axis, and first and second magnetic field measuring means, the shaft member having an integral annular outer circumferential portion made of a ferromagnetic material, wherein the shaft member includes a first annular axial portion of the integral ferromagnetic annular outer circumferential portion that axially terminates with a first end face substantially perpendicular to the central axis of the shaft member and is magnetized to bear magnetic fluxes circumferentially circulating therealong, a second axial portion of the integral ferromagnetic annular outer circumferential portion that axially terminates with a second end face substantially perpendicular to the central axis of the shaft member and is magnetized to bear magnetic fluxes circumferentially circulating therealong, the second annular axial portion being proportionally less stressed by the torque applied to the shaft member than said first annular axial portion, the first magnetic field measuring means measuring magnetic fluxes generated to traverse the first end face of the first annular axial portion by the shaft member being applied with a torque to be measured therethrough, and the second magnetic field measuring means for measuring magnetic fluxes generated to traverse the second end face of the second annular axial portion by the shaft member being applied with the torque to be measured therethrough, so as to measure the torque applied to the shaft member based upon an inverse magnetostriction with a cancellation of an influence of a hysteresis in the inverse magnetostriction of the ferromagnetic material on the result of measurement by a compensation of the measurement by the first magnetic field measuring means with the measurement by the second magnetic field measuring means.

2. A torque measuring device comprising a shaft member having a central axis and a generally circular cross section centered at the central axis to be applied with a torque to be measured around the central axis, and magnetic field measuring means, the shaft member having an integral annular outer circumferential portion made of a ferromagnetic material, the integral ferromagnetic annular outer circumferential portion including an annular axial portion magnetized to bear magnetic fluxes circumferentially circulating therealong and around the central axis, the first annular axial portion axially terminating with an end face substantially perpendicular to the central axis of the shaft member, wherein the magnetic field measuring means measures magnetic fluxes generated to traverse the end face of the annular axial portion due to an inverse magnetostriction induced by a torque applied through the shaft member, so as to measure the torque applied to the shaft member.

3. A torque measuring device according to claim 1, wherein the second annular axial portion is defined between two annular grooves formed in and axially spaced along the shaft member.

4. A torque measuring device according to claim 1, wherein the second annular axial portion is defined between an annular groove axially spacing the second annular axial portion from the first annular axial portion and a reduced diameter axial portion extending on an axial side of the second annular axial portion opposite to the annular groove with an outer diameter smaller than that of the second annular axial portion.

5. A torque measuring device according to claim 1, wherein the second annular axial portion is an annular outer circumferential portion of an axial portion of the shaft member having a larger diameter than the first annular axial portion and axially spaced from the first annular axial portion via an annular groove formed therebetween.

6. A torque measuring device comprising a shaft member having a central axis and a generally circular cross section centered at the central axis to be applied with a torque to be measured around the central axis, and magnetic field measuring means, the shaft member having an integral annular outer circumferential portion made of a ferromagnetic material, wherein the shaft member includes a first annular axial portion of the integral ferromagnetic annular outer circumferential portion that axially terminates with a first end face substantially perpendicular to the central axis of the shaft member and is magnetized to bear magnetic fluxes circumferentially circulating therealong, a second annular axial portion of the integral ferromagnetic annular outer circumferential portion that axially terminates with a second end face substantially perpendicular to the central axis of the shaft member and is magnetized to bear magnetic fluxes circumferentially circulating therealong, the second annular axial portion being proportionally less stressed by the torque applied to the shaft member than said first annular axial portion, the second end face axially opposing the first end face with an annular groove formed therebetween, the magnetic filed measuring means measuring the magnetic fluxes generated to traverse the first end face of the first annular axial portion under an interference of magnetic fluxes generated to traverse the second end face of the second annular axial portion by the shaft member being applied with the torque to be measured therethrough, so as to measure the torque applied to the shaft member based upon the inverse magnetostriction, with a cancellation of an influence of a hysteresis in the magnetostriction of the ferromagnetic material on the result of measurement according to a hysteresis canceling interference of the magnetic fluxes traversing the second end face with the magnetic fluxes traversing the first end face.

7. A torque measuring device according to claim 6, wherein the second annular axial portion is defined between two annular grooves formed on and axially spaced along the shaft member.

8. A torque measuring device according to claim 6, wherein the second annular axial portion is defined between an annular groove axially spacing the second annular axial portion from said first annular axial portion and a reduced diameter axial portion extending on an axial side of the second annular axial portion opposite to the annular groove with an outer diameter smaller than that of the second annular axial portion.

9. A torque measuring device according to claim 6, wherein the second annular axial portion is an annular outer circumferential portion of an axial portion of the shaft member having a larger diameter than the first annular axial portion and axially spaced from the first annular axial portion via an annular groove formed therebetween.

* * * * *